United States Patent [19]

Takahashi et al.

[11] Patent Number: 5,392,148
[45] Date of Patent: Feb. 21, 1995

[54] OPTICAL SPACE COMMUNICATING APPARATUS

[75] Inventors: Yasuhiro Takahashi, Urawa; Tetsuo Sakanaka, Sagamihara, both of Japan

[73] Assignee: Canon Kabushiki Kaisha, Tokyo, Japan

[21] Appl. No.: 984,530

[22] Filed: Dec. 2, 1992

[30] Foreign Application Priority Data

Dec. 2, 1991 [JP] Japan .................. 3-318089

[51] Int. Cl.$^6$ .................. H04B 10/00
[52] U.S. Cl. .................. 359/182; 359/143; 359/172; 340/825.72
[58] Field of Search .............. 359/113, 143, 147, 152, 359/171-172; 455/78, 90, 127, 343; 340/825.72

[56] References Cited

U.S. PATENT DOCUMENTS

| | | | |
|---|---|---|---|
| 4,641,374 | 2/1987 | Oyama | 359/143 |
| 4,792,996 | 12/1988 | Oyama | 359/143 |
| 4,904,993 | 2/1990 | Sato | 340/825.72 |
| 5,105,294 | 4/1992 | Degura et al. | 359/154 |
| 5,113,278 | 5/1992 | Degura et al. | 359/154 |
| 5,239,295 | 8/1993 | DeLuca et al. | 359/147 |

*Primary Examiner*—Richard E. Chilcot, Jr.
*Assistant Examiner*—K. Negash
*Attorney, Agent, or Firm*—Fitzpatrick, Cella, Harper & Scinto

[57] ABSTRACT

An optical communicating apparatus has an optical transmitting unit and an optical receiving unit which are accommodated in the same casing. The apparatus is provided with a distributing circuit for supplying a power source to the optical transmitting unit and the optical receiving unit. A modulation device and a demodulation device are connected to the optical space communicating apparatus. The modulation device modulates a transmission signal and has a first power source unit to supply a power source to the distributing circuit. The demodulation device demodulates a reception signal and has a second power source unit to supply a power source to the distributing circuit. A switching device is arranged between the distributing circuit and the first power source unit or between the distributing circuit and the second power source unit. The switching device selects either one of the first and second power source units to connect the selected power source unit to the distributing circuit, so that the power source is applied to each unit in the apparatus through the distributing circuit.

4 Claims, 4 Drawing Sheets

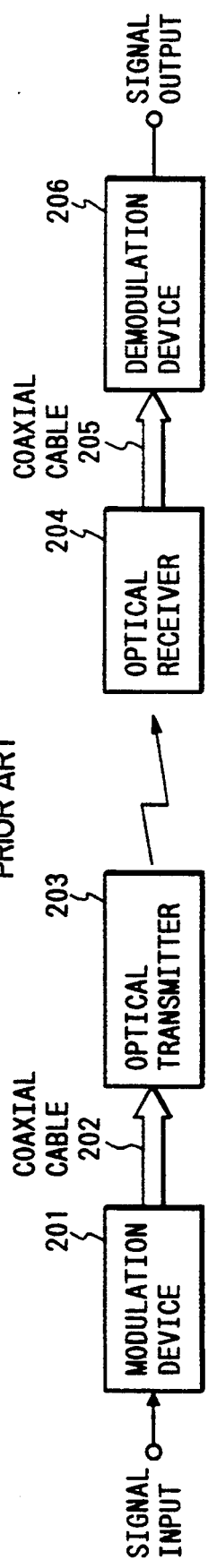
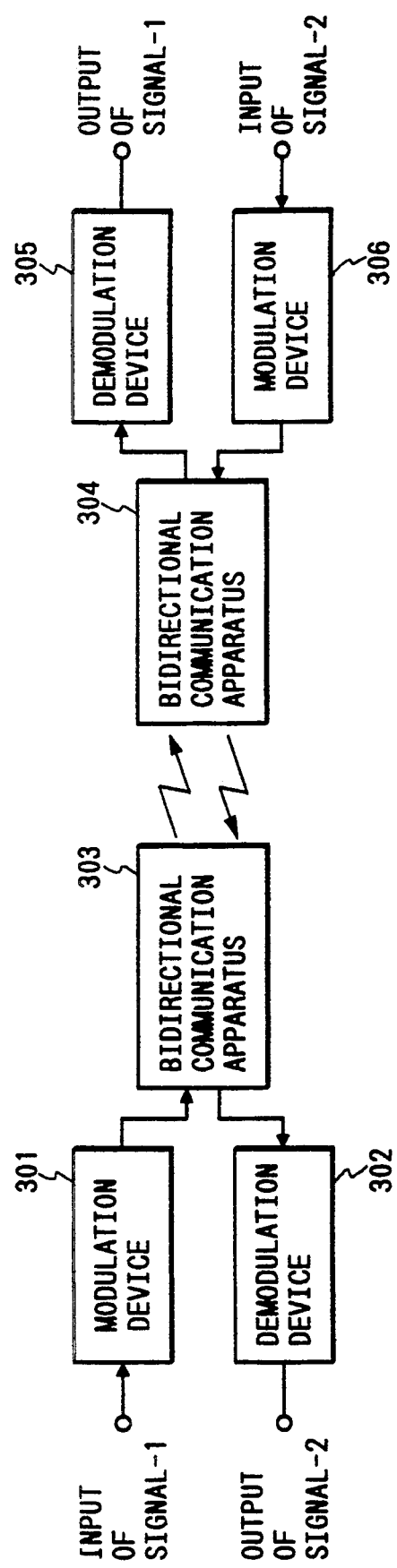

OPTICAL SPACE COMMUNICATING APPARATUS

BACKGROUND OF THE INVENTION

1. Field of the Invention

The invention relates to an optical space communicating apparatus in which an optical transmitter and an optical receiver are assembled in the same casing.

2. Related Background Art

As a conventional optical space communicating apparatus, for instance, as shown in FIG. 1, there is known a unidirectional communication system comprising an optical transmitter 203 to which a modulation device 201 is connected through a coaxial cable 202 and an optical receiver 204 to which a demodulation device 206 is connected through a coaxial cable 205. As shown in FIG. 2, there is also known a bidirectional communication system comprising a pair of bidirectional communication apparatuses 303 and 304 in which an optical transmitter and an optical receiver are assembled in the same casing. In case of the optical space communication, since the light has a linear propagation property, the communication is generally executed in an open space which can be seen through. The optical transmitter/receiver or the optical communication apparatus is set at a perspective location which can be seen through.

In the bidirectional communication apparatuses 303 and 304, as shown in FIG. 2, modulation devices 301 and 306 and demodulation devices 302 and 305 each of which has a power supply unit are connected to the optical transmitter and optical receiver, respectively.

An example of input and output circuits of a signal and a power source in each of the above bidirectional communication apparatuses 303 and 304 will now be described with reference to FIG. 3. The bidirectional communication apparatus 303 will now be described as an example.

A power source is multiplexed to a signal from the modulation device 301 and the resultant signal is supplied to a terminal 401 through a coaxial cable 400. The modulation device 301 includes a modulator 301-1 and a power source unit 301-2. The modulator 301-1 is coupled to the terminal 401 through a high pass filter 301-3 and the power source unit 301-2 is coupled to the terminal 401 via a switch and a low pass filter 301-4. The signal from the modulator 301-1 through the high pass filter 301-3 passes through a high pass filter (HPF) 402 and a terminal 403 and is supplied to a light emitting unit 421 of the optical transmitter in the bidirectional communication apparatus 303. On the other hand, a power input signal which is supplied from the power source unit 301-2 of the modulation device 301 through the terminal 401 passes through a low pass filter (LPF) 404 and is supplied to a power distribution circuit 409. A light beam from the light emitting unit 421 is converged by a converging lens 423 and sent to another bidirectional communication apparatus 304.

A light beam from another bidirectional communication apparatus 304 is converged by a converging lens 424 and is received by a light receiving unit 422. The reception signal from the light receiving unit 422 of the optical receiver in the bidirectional communication apparatus is connected to a terminal 407 and passes through a high pass filter (HPF) 406 and a terminal 408 and is supplied to the demodulation device 302 through a coaxial cable. The demodulation device 302 includes a demodulator 302-1 and a power source unit 302-2. The demodulator 302-1 is coupled to the terminal 401 through a high pass filter 302-3 and the power source unit 302-2 is coupled to the terminal 401 via a switch and a low pass filter 302-4. The signal from the high pass filter 406 is applied to the demodulator 302-1 through the high pass filter 302-3. A power input signal from the power source unit 302-2 of the demodulation device 302 is connected to the terminal 408 through the coaxial cable 400 and passes through a low pass filter (LPF) 405 and is supplied to the power distribution circuit 409.

The power source which is supplied to the power distribution circuit 409 is supplied to the light emitting unit 421 and light receiving unit 422 through a terminal 410 and a power circuit 420. The light emitting unit 421 and light receiving unit 422 are driven by the power source.

In case of the power input/output circuit of the bidirectional communication apparatus shown in FIG. 3 mentioned above, when the power source unit of either one of the modulation device 301 and the demodulation device 302 which are connected to the terminals 401 and 408 is set to OFF, there is a possibility such that the power source current from the other apparatus flows into the apparatus whose power source unit is OFF. Therefore, as shown in FIG. 4, there is also a construction such that an isolator 411 formed by two diodes 2 is connected between the power distribution circuit 409 and the LPFs 404 and 405, thereby preventing the inflow of the power source current mentioned above. A circuit section shown in FIG. 4 is also connected in a manner similar to FIG. 3. However, the above bidirectional communication apparatus has the following problems.

In case of the bidirectional communication apparatus, it is desirable that the power in the apparatus is commonly used for the transmitting unit and the receiving unit because the power circuit in the apparatus is simplified.

In the case where the power is supplied to the bidirectional communication apparatus from the modulation device or demodulation device connected to the bidirectional communication apparatus, it is necessary for the user to select and switch the power source unit which is used on the side of the modulation device or demodulation device.

There is also considered a construction such that the power is provided for only either one of the modulation device or demodulation device. In such a case, however, when the bidirectional communication apparatus is used as a unidirectional communication for only transmission or reception, a situation such that no power is supplied to the bidirectional communication apparatus occurs.

With respect to the input/output circuit in the bidirectional communication apparatus shown in FIG. 3 mentioned above, the source voltage which is applied to the power distribution circuit 409 is not compensated so long as the kind of power source indicates the AC.

In many cases, the devices of the same specifications are used as modulation device and demodulation device which are connected to the bidirectional communication apparatus. Different signals in the same frequency band exist at the terminals 401 and 408 in the input/output circuit. Therefore, a large isolation must be provided between the terminals 401 and 408.

Inherently, in order to sufficiently obtain such an isolation, the low pass filters 404 and 405 are provided in the input/output circuit. In the case where the signal is in a wide band, however, since the signal frequency exists from a very low frequency band, it is difficult to design a low pass filter to separate the signal and the power source. Consequently, it is difficult to obtain the signal isolation in a wide band between the terminals 401 and 408. On the other hand, values and shapes of an inductor and a capacitor which construct the low pass filter increase, so that there is a case where enough attenuation cannot be obtained for the signal frequency in order to miniaturize the LPF. In the above input/output circuit, not only in the case of the circuit section shown in FIG. 3 but also in the case of the circuit section using the isolator as shown in FIG. 4, each of the diodes for a high withstanding voltage and a large current which are used in the isolator has a large capacitance across terminals. A sufficiently coarse coupling state is not derived for the signal frequency.

SUMMARY OF THE INVENTION

The invention is made in consideration of the problems in the foregoing techniques and it is an object of the invention to provide an optical space communicating apparatus which can obtain good isolation between the transmitting unit and the receiving unit irrespective of the kind of power.

According to the invention, there is provided an optical space communicating apparatus comprising: a distributing circuit in which an optical transmitting unit and an optical receiving unit are assembled in the same casing and which distributes power to the optical transmitting unit and the optical receiving unit; a modulation device which modulates a transmission signal and has a first power source unit to supply power to the distributing circuit; and a demodulation device which demodulates a reception signal and has a second power source unit to supply power to the distributing circuit, wherein a change-over relay which selects a predetermined one of the first and second power source units and connects it to the distributing circuit and is switched by an output voltage of the first or second power source unit is arranged between the distributing circuit and the first power source unit or between the distributing circuit and the second power source unit.

According to the optical space communicating apparatus of the invention, since the first power source unit of the modulation device and the second power source unit of the demodulation device are connected to the distributing circuit through the change-over relay, only either one of the first and second power source units is connected as a power source unit to the distributing circuit, so that a short-circuit between them is prevented. Even in case of using the optical space communicating apparatus as either one of the optical transmitter or optical receiver in the unidirectional communication, the power source unit of the corresponding modulation device or demodulation device is connected to the distributing circuit and power is supplied thereto.

BRIEF DESCRIPTION OF THE DRAWINGS

FIG. 1 is a block diagram showing an example of a unidirectional communication system using an optical space communicating apparatus;

FIG. 2 is a block diagram showing an example of a bidirectional communication system using an optical space communicating apparatus;

DETAILED DESCRIPTION OF THE PREFERRED EMBODIMENTS

An embodiment of the invention will be described hereinbelow with reference to the drawings.

Figure 5:
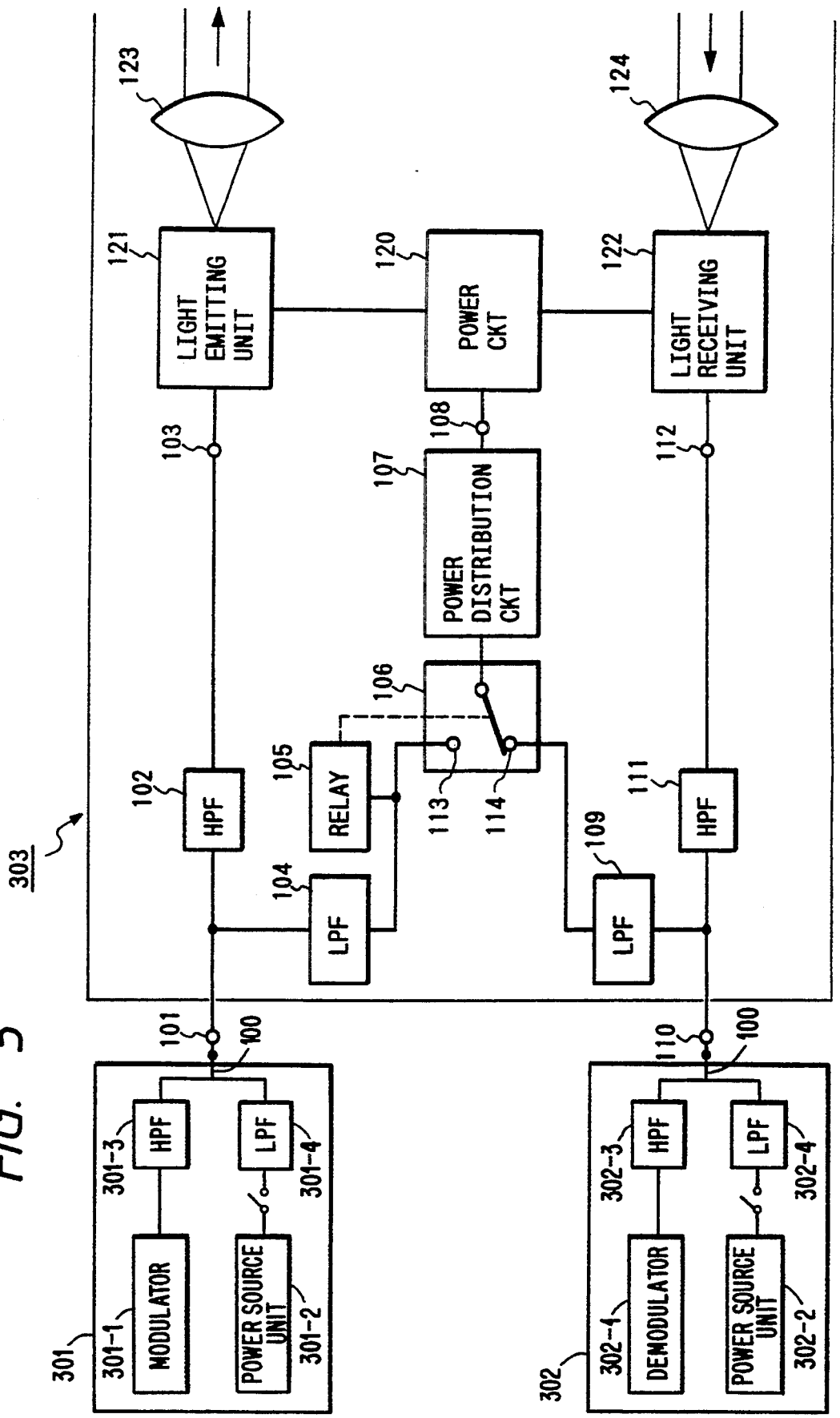
FIG. 5 is a block diagram showing an embodiment of the input/output circuit of the optical space communicating apparatus of the invention.

FIG. 5 is a block diagram showing an embodiment of an optical space communicating apparatus of the invention.

The optical space communicating apparatus of the embodiment is used in the optical communication system described in FIG. 2 mentioned above and has a pair of bidirectional communication apparatuses 303 and 304 in each of which the optical transmitter and the optical receiver are assembled in the same casing. In each of the bidirectional communicating apparatus, the modulation device (301 or 306) is connected to the optical transmitter and the demodulation device (302 or 305) is connected to the optical receiver.

The input/output circuit of the signal and power source in the bidirectional communicating apparatus will now be described with reference to FIG. 5.

FIG. 5 is a diagram showing an example of the input/output circuit of the signal and power source in the bidirectional communication apparatus 303. Another apparatus 304 is also constructed in a manner similar to the apparatus 303.

The input/output circuit of the embodiment selects either one of the power sources units of the modulation device 301 and the demodulation device 302 and supplies power to each unit of the bidirectional communication apparatus 303. The input/output circuit also transfers the transmission signal from the modulation device 301 to the optical transmitting unit and transfers the reception signal from the optical receiving unit to the demodulation device 302.

Figure 3:
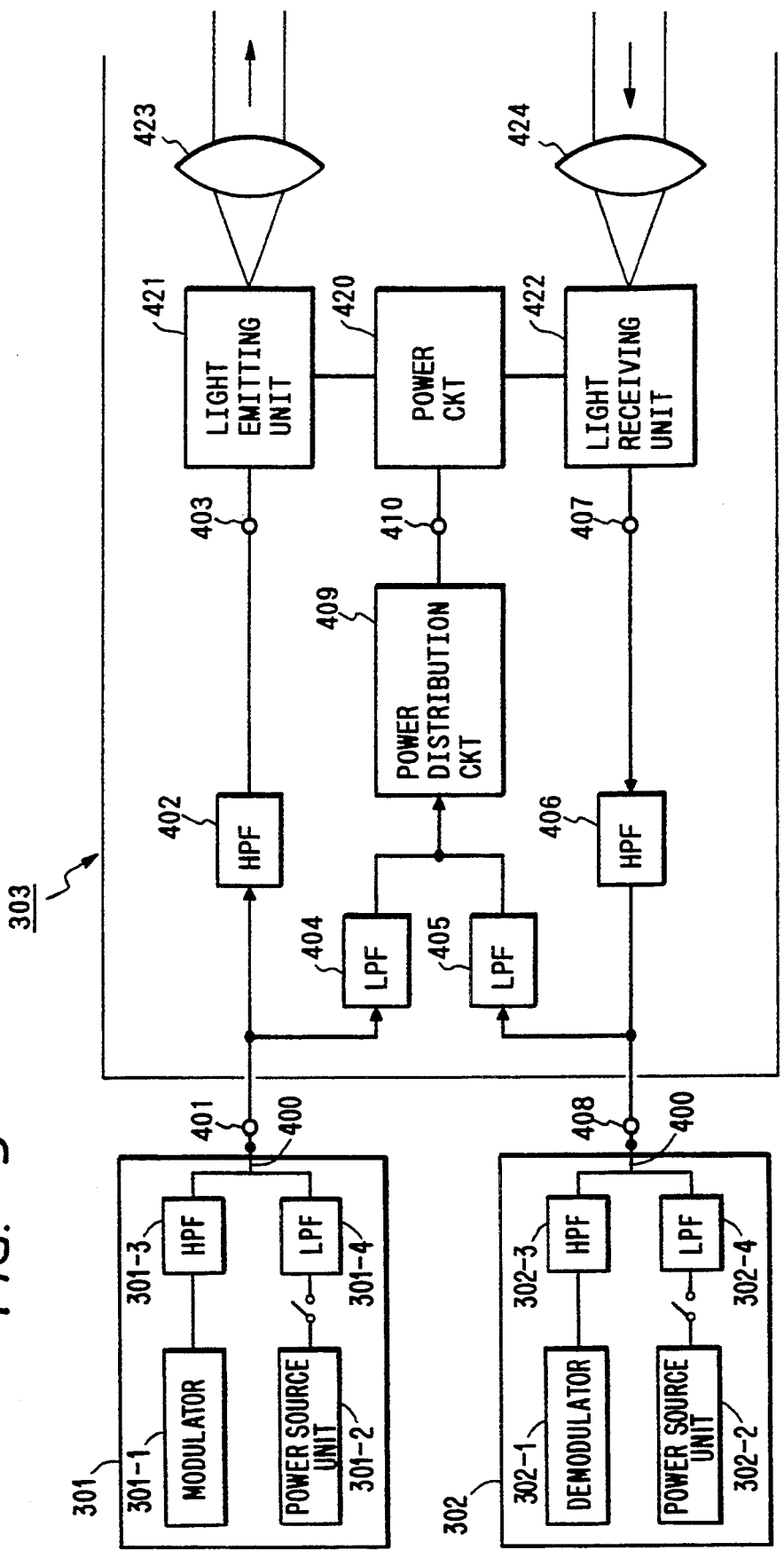
FIG. 3 is a block diagram showing an example of an input/output circuit of the optical space communicating apparatus.
Figure 4:
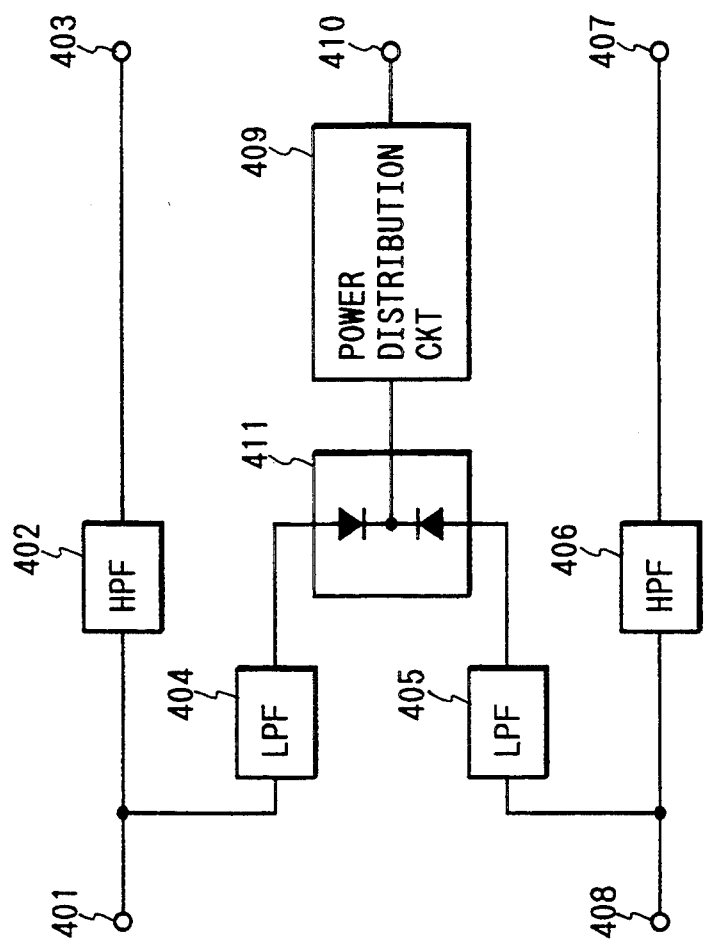
FIG. 4 is a block diagram showing another example of an input/output circuit of the optical space communicating apparatus.

The modulation device 301 already described with respect to FIG. 3 modulates the transmission signal and has a first power source unit to supply power. The demodulation device 302 already described with respect to FIG. 3 demodulates the reception signal and has a second power source unit to supply power.

The power is multiplexed to the transmission signal and the resultant signal is supplied from the modulation device 301 to a terminal 101 through a coaxial cable 100 and sent to a high pass filter (HPF) 102 and a low pass filter (LPF) 104. In the HPF 102, only the transmission signal passes there through and is sent to a light emitting unit 121 of the optical transmitter through a terminal 103. On the other hand, in the LPF 104, only the power passes there through and is connected to one terminal 113 of a switching device 106. A light beam from the light emitting unit 121 is converged by a converging lens 123 and is sent to another bidirectional communication apparatus 304.

A light beam from another bidirectional communication apparatus 304 is converged by a converging lens 124 and is received by a light receiving unit 122. The reception signal from the light receiving unit 122 of the optical receiver is supplied to an HPF 111 through a terminal 112 and passes through the HPF 111 and is sent to the demodulation device 302 through a terminal 110. The power is supplied from the demodulation device 302 to the terminal 110 through the coaxial cable 100 and passes through a low pass filter (LPF) 109 and is sent to another terminal 114 of the switching device 106.

The power which is supplied to a power distribution circuit 107 is supplied to the light emitting unit 121 and the light receiving unit 122 through a terminal 108 and a power circuit 120. The light emitting unit 121 and the light receiving unit 122 are driven by the power.

The switching of the switching device 106 is performed by a relay 105 which is made operative by a voltage that is supplied from the power source unit 301-2 of the modulation device 301. A common terminal of the switching device 106 is connected to the power distribution circuit 107 for supplying the power to each unit of the bidirectional communication apparatus 303. The contact of the switching device 106 ordinarily connects the common terminal and the terminal 114 which is connected to the power source unit 302-2 of the demodulation device 302. When the power of the power source unit 301-2 of the modulation device 301 is supplied, the contact of the switching device 106 is switched to the terminal 113 side which is connected to the power source unit 301-2 of the modulation device 301.

As described above, according to the invention, the optical space communicating apparatus in which the light transmitting unit and the light receiving unit are accommodated in the same casing has the power distribution circuit 107 for distributing power to the light transmitting unit and the light receiving unit. The power distribution circuit 107 is connected to the power source unit of the modulation device and the power source unit of demodulation device through the switching device 106. The switching device 106 ordinarily connnects the power source unit of the demodulation device and the power distribution circuit 107 and is switched by the relay 105 which is made operative by receiving the voltage from the power source unit of the modulation device.

The operation of the embodiment will now be described.

In the pair of bidirectional communication apparatuses 303 and 304, it is now assumed that one of them is set to the first communication apparatus 303 and the other is set to the second communication apparatus 304.

First, the case of using the optical space communicating apparatus of the embodiment as a bidirectional communication system will be considered as an example with reference to FIG. 2. The input/output circuit for signal and power which has been described in FIG. 5 is provided for each of the communication apparatuses 303 and 304.

In this case, in the first and second communication apparatuses 303 and 304, since both of the modulation devices 301 and 306 and the demodulation devices 302 and 305 are turned on, power is supplied from both of them. Therefore, the contacts of the switching devices 106 of the first and second communication apparatuses 303 and 304 are in contact with the terminals 113 which are connected to the power source units of the modulation devices 301 and 306. Thus, the power from the power source units of the modulation devices 301 and 306 are applied to each unit of the first and second communication apparatuses 303 and 304 through the power distribution circuits 107.

Subsequently, the case of using the optical space communicating apparatus of the embodiment as a unidirectional communication system will now be considered with reference to FIG. 2. The input/output circuit of the signal and power source which has been described in FIG. 5 is provided for each of the communication apparatuses 303 and 304.

It is now assumed that the first communication apparatus 303 is set to the transmitting side and the other second communication apparatus 304 is set to the receiving side.

The first communication apparatus 303 will be first considered.

Since the first communication apparatus 303 is set to the transmitting side, the demodulaiton device 302 is OFF and only the modulation device 301 is ON. Only the power from the power source unit 301-2 of the modulation device 301 is supplied to the switching device 106 of the input/output circuit. Consequently, the relay 105 is made operative, the terminal 113 connected to the power source unit of the modulation device 301 is selected by the switching device 106, and power is supplied to the power distribution circuit 107.

On the other hand, in case of the second communication apparatus 304 as a receiving side, the demodulation device 305 is ON, the modulation device 306 is OFF, and only the power from the power source unit 302-2 of the demodulation device 305 is supplied to the switching device 106 of the input/output circuit. Therefore, the relay 105 of the input/output circuit is not made operative and is in the OFF state. The switching device 106 selects the terminal 114 connected to the power source unit of the demodulation device 305. Thus, the power from the power source unit of the demodulation device 305 is supplied to the power distribution circuit 107 and is applied to each unit of the second communication apparatus 304.

As mentioned above, in case of using the bidirectional communicating apparatus as a unidirectional communication system, a construction such that the first communicating apparatus is used as a receiving side and the second communication apparatus is used as a transmitting side can be also similarly considered.

According to the embodiment, the operating voltage of the relay 105 of the input/output circuit has been equalized to the voltage that is supplied from the power source unit of the modulation device. However, the delay 105 can be also made operative by the voltage which is supplied from the power source unit of the demodulation device. In this case, a similar effect can be obtained by connecting the relay 105 in parallel between the LPF 109 and the switching device 106 of the input/output circuit shown in FIG. 5 and by, further, controlling the switching device 106 so as to ordinarily select the terminal 113 connected to the power source unit of the modulation device.

According to the invention as described above, there can be obtained the following effects.

(1) Only either one of the power source units of the modulation device and demodulation device is connected as a power source unit to the distribution circuit of the bidirectional optical space communicating apparatus and a failure of the communication apparatus due to a short-circuit between them or the like is prevented, so that a reliability of the communicating operation is improved.

(2) Even in case of using the bidirectional optical space communicating apparatus as an optical transmitter or optical receiver of the unidirectional communication, the power is automatically supplied from the power source unit of the modulation device or demodulation device corresponding to the optical transmitter or optical receiver, so that the manual switching operation by the operator is unnecessary. The operation is simplified. The reliability is also improved.

(3) Since the power source unit is switched by using the mechanical contact of the switching relay, good isolation is obtained not only between the power sources but also between the transmission signal and the reception signal.

What is claimed is:

1. An optical space communication apparatus comprising:
    distributing means for distributing power to a light transmitting unit and a light receiving unit;
    modulating means which modulates a transmission signal and comprises a first power source unit for supplying power to said distributing means;
    demodulating means which demodulates a reception signal and comprises a second power source unit for supplying power to the distributing means; and
    switching means coupled between the distributing means and the first power source unit and the second power source unit for selecting either one of the first and second power source units and for coupling the selected one of the first and second power source units to the distributing means.

2. An apparatus according to claim 1, wherein said switching means is switched and driven by a power source voltage of either one of the first and second power source units.

3. An optical space communicating apparatus comprising:
    transmitting means for transmitting an optical signal;
    receiving means for receiving the optical signal from said transmitting means;
    distributing means for distributing power to the transmitting means and the receiving means;
    modulating means which modulates a transmission signal and comprises a first power source unit for supplying power to the distributing means;
    demodulating means which demodulates a reception signal and comprises a second power source unit for supplying power to the distributing means; and
    switching means coupled between the distributing means and the first power source unit and the second power source unit for selecting either one of the first and second power source units and for coupling the selected one of the first and second power source units to the distributing means.

4. An apparatus according to claim 3, wherein said switching means is switched and driven by a power source voltage of either one of the first and second power source units.

* * * * *